March 13, 1962 E. J. LUOMA ETAL 3,025,463
APPARATUS FOR MEASUREMENT OF COMPLEX REFLECTION COEFFICIENT
Filed Nov. 22, 1957 2 Sheets-Sheet 1
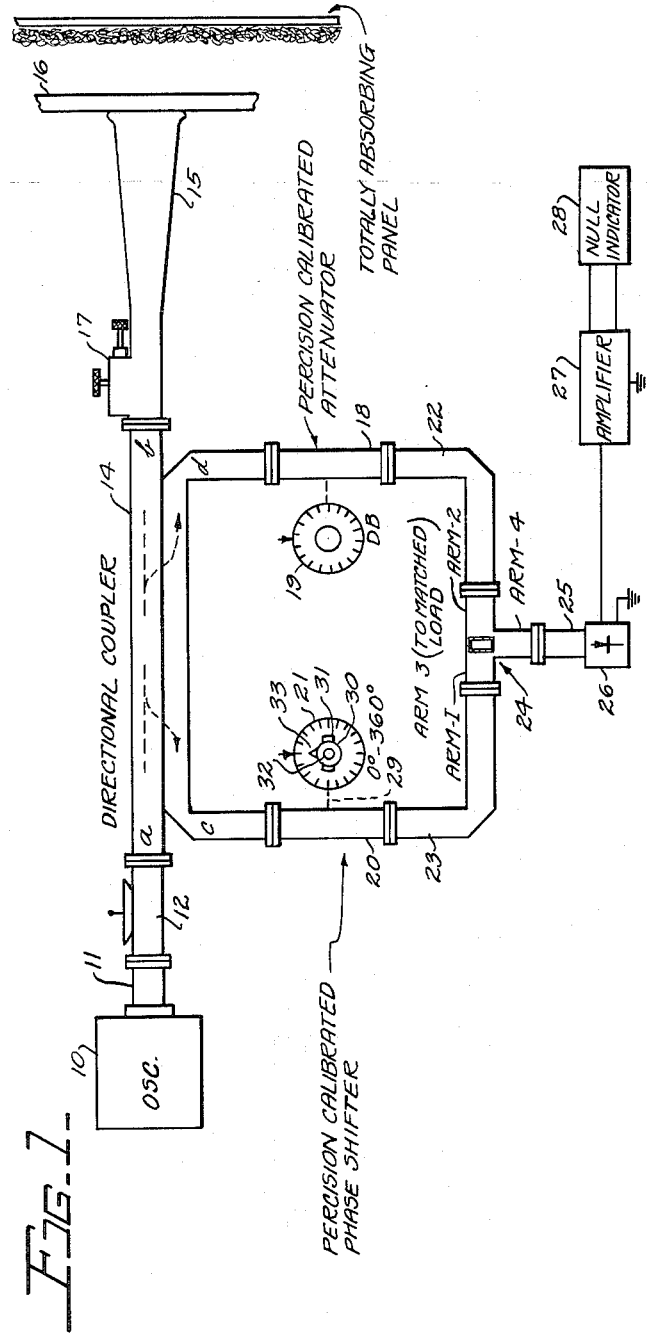
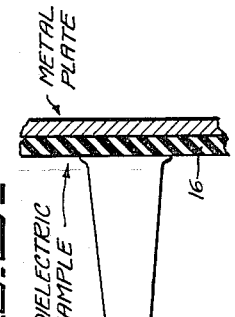
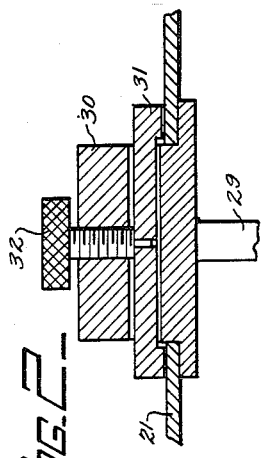
INVENTORS.
EINO J. LUOMA
EMANUEL H. GROSS
BY Wade Looney
ATTORNEY and
James L. Shannon
AGENT

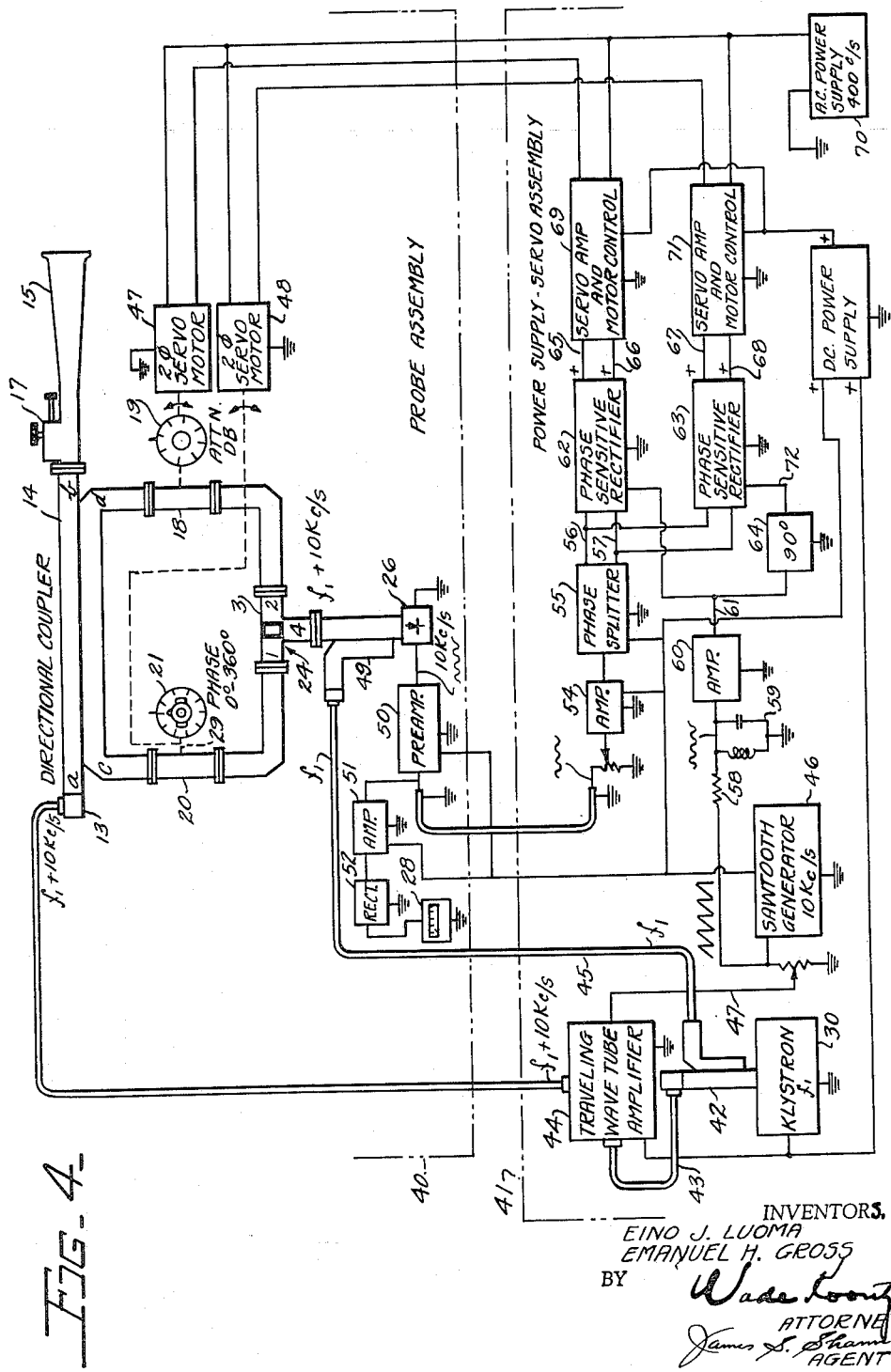

United States Patent Office 3,025,463
Patented Mar. 13, 1962

3,025,463
APPARATUS FOR MEASUREMENT OF COMPLEX REFLECTION COEFFICIENT
Eino J. Luoma, Fairborn, and Emanuel H. Gross, Dayton, Ohio, assignors to the United States of America as represented by the Secretary of the Air Force
Filed Nov. 22, 1957, Ser. No. 698,316
3 Claims. (Cl. 324—58.5)
(Granted under Title 35, U.S. Code (1952), sec. 266)

The invention described herein may be manufactured and used by or for the United States Government for governmental purposes without payment to us of any royalty thereon.

This invention is a device for the measurement, at microwave frequencies, of the magnitude and phase of the reflection coefficient of any reflecting object or body but particularly that of a dielectric wall. The device is designed to be used as a gauge for making this measurement over a small area of the dielectric sample thus permitting localized evaluations of the reflection magnitude and phase over the surface of the sample. Since the reflection coefficient is a function of the dielectric constant, electrical thickness and loss factors of the dielectric, its successive measurement over the surface of the wall serves as an indication of the uniformity of the wall. Although intended primarily for checking radomes or antenna lenses for dielectric uniformity, such uniformity being desirable for reducing bore sight error to a minimum, the instrument can also be used in the quality control of any dielectric material such as paper, plastic film, glass and ceramic articles.

The complex reflection coefficient of a dielectric sample may be specified on either a voltage or a power basis. The absolute magnitude $|R|$ of the voltage reflection coefficient is defined as the ratio of the voltage of the reflected wave to that of the incident wave, while the absolute magnitude $|R|^2$ of the power reflection coefficient is defined as the ratio of reflected power to incident power. The described instrument measures $|R|^2$ from which R may be derived by extracting the square root. In either case the angle $R'$ of the reflection coefficient is the phase angle by which the reflected wave lags the incident wave.

The instrument has certain advantages over the commonly used interferometer for investigating dielectric properties. Interferometers measure the complex transmission coefficient, rather than the reflection coefficient, by means of two antennas, one on each side of the dielectric wall. The spacing between these antennas must be very accurately maintained. This invention, by using reflectometer techniques, permits the elimination of the second antenna. Since only one antenna is present, it can be made small and the equipment portable allowing rapid measurements to be made over an entire radome, or other dielectric sample, without the necessity for extensive jigs and fixtures for sample positioning. This feature of the invention makes it especially suitable for the quality control of radomes during the manufacturing process.

Briefly, the instrument comprises a source of high frequency energy feeding a horn antenna through a directional coupler. The sample to be tested is preferably held directly against the mouth of the horn which serves both to direct power toward the sample and to receive power reflected from the sample. The directional coupler diverts a fixed portion of the antenna feed power to a precision calibrated attenuator and also directs the reflected power received by the antenna horn to a precision calibrated phase shifter. The difference between the outputs of the attenuator and phase shifter is detected and applied to a null indicator. A null occurs when the outputs of the attenuator and phase shifter are identical in amplitude and phase, a condition which can be attained by appropriate adjustment of the attenuator and phase shifter.

The instrument is calibrated with a dielectric sample of known reflection coefficient before measurements upon an unknown sample are made. The calibration is accomplished by adjusting the attenuator and phase shifter for the null condition with the known sample in place before the horn. The known sample is then replaced by the unknown sample and the attenuator and phase shifter readjusted for the null condition. The magnitude and phase of the unknown reflection coefficient can then be found by algebraically adding the changes required in the attenuator and phase shifter settings to attain the second null to the magnitude and phase, respectively, of the reflection coefficient of the known sample. Adjustment of the attenuator and phase shifter may be accomplished manually or automatically by means of a null seeking servo system.

The device may also be used for measuring the complex transmission coefficient of an object such as a dielectric wall. The procedure is to first measure the magnitude and angle of the reflection coefficient as described above, and then to make the same measurements with the sample backed by a totally reflecting metal plate. The transmission coefficient can be computed from these four measured values, as will be explained later.

A more detailed description of the invention will be given in conjunction with the specific embodiments thereof shown in the accompanying drawings, in which FIG. 1 is an embodiment of the reflection coefficient measuring instrument arranged for manual adjustment;

FIG. 2 is a detail of FIG. 1 showing the manner of locking the phase shifter dial;

FIG. 3 shows a technique used in measuring the complex transmission coefficient; and FIG. 4 shows an embodiment of the instrument incorporating automatic null adjustment.

Referring to FIG. 1 the high frequency at which the instrument operates, for example 7000 mc./s., is generated by oscillator 10, which may be for example a Varian V203b klystron, and applied to the instrument over wave guide 11 and attenuator 12. The high frequency output of attenuator 12 is coupled to arm "a" of directional coupler 14. The design of the directional coupler is such that energy incident upon arm "a" is coupled into arms "b" and "d" but not arm "c," and reflected energy in arm "b" is coupled into arms "a" and "c" but not into arm "d." The coupling ratio from arm "a" to arm "b" is made large so that the greater portion of the power incident on arm "a" from attenuator 12 is applied through arm "b" to horn 15 and only a small fraction of this power is directed into arm "d." The power feeding horn 15 is directed by the horn against dielectric sample 16 which preferably is positioned against its mouth. The power reflected from the dielectric reenters horn 15 and is incident upon arm "b" of the directional coupler. Since only a small part of the incident power is reflected by the dielectric, the coupling ratio from arm "b" to arm "c" is made large so that the greater portion of the reflected power enters arm "c." In order that the power in arm "d" be accurately proportional to the power incident upon the dielectric sample and that the power in arm "c" be accurately proportional to the power reflected from the dielectric sample, the couplings from arm "b" to arm "d" and from arm "a" to arm "c" must be of negligible proportions. Element 17 is a conventional slide screw tuner for horn 15.

The power in arm "d," which is proportional to the power incident upon the dielectric sample, is applied to precision calibrated power attenuator 18. This attenuator is manually adjustable through dial 19 which is calibrated in decibels of attenuation. A suitable attenuator for this purpose is the Hewlett-Packard Model X382A. The power in arm "c" which is proportional to the power reflected from the dielectric sample, is applied to precision calibrated phase shifter 20. This phase shifter, which, for example, may be a Hewlett-Packard Model X885A, is manually adjustable through dial 21 which is calibrated from 0° to 360° phase shift. The shaft 29 is permanently attached to knob 30 while dial 21 is clamped to knob 30 by clamping bar 31 and clamping screw 32, as shown more clearly in FIG. 2. This arrangement permits the dial to be clamped to knob 30 and shaft 29 at any desired angular position for reasons which will appear later. A pointer 33 may be carried by knob 30 for alignment with any predetermined point, for example 0°, on dial 21 when it is desired that the dial read actual phase shift. The outputs of attenuator 18 and phase shifter 20 are applied through waveguides 22 and 23 to arms 2 and 1, respectively, of magic T 24.

The magic T, which is well known in the art and described in the literature, for example on pages 306–308 of vol. 8, Principles of Microwave Circuits, Radiation Laboratory Series, McGraw-Hill, has the property that the sum of the powers incident on arms 1 and 2 appears in arm 3 and the difference in these powers appears in arm 4. Arms 1 and 2, which are common to the two T-junctions that form the magic T, are sometimes referred to as the side arms, whereas arm 3, which is part of the E-plane T-junction, is referred to as the E-arm and arm 4, which is part of the H-plane T-junction is referred to as the H-arm. In this application sum arm 3 is terminated in a matched load (not shown) while difference arm 4 is coupled by waveguide 25 to crystal detector 26. Any signal occurring in arm 4 is rectified by the crystal detector and the resulting direct current output, after amplification in amplifier 27, is applied to null indicator 28 which may be, for example, a vacuum tube voltmeter. When the waves incident upon arms 1 and 2 are alike in amplitude and phase the signal in arm 4 is zero, the output of detector 26 is zero and null indicator 28 has its minimum reading. If the waves in arms 1 and 2 differ in amplitude or phase, or both, a signal appears in arm 4 and is indicated by an increased reading on the null indicator. Therefore, adjustment of attenuator 18 and phase shifter 20 for a minimum reading of the null indicator results in adjustment of the waves in arms 1 and 2 to a condition of equality in amplitude and phase.

To measure the complex reflection coefficient of an unknown dielectric sample it is first necessary to calibrate the instrument with a dielectric sample for which the magnitude and angle of the reflection coefficient are known. For maximum accuracy the reflection coefficient of the calibration sample should be as near that of the unknown sample as possible. The calibration sample is placed against the mouth of horn 15 and the phase shifter and attenuator of the instrument adjusted for a null at null indicator 28. Dial 21 of the phase shifter is then released by means of clamping screw 30, set to the reflection coefficient angle of the calibration sample and reclamped to the shaft 29. The reading of attenuator dial 19 is also noted. Next, the calibration sample is replaced by the unknown sample and the instrument readjusted for a null. The dial 21 then reads the angle of the desired reflection coefficient directly. The magnitude of the desired reflection coefficient is obtained by algebraically adding the difference in the readings of attenuator dial 19 for the two nulls to the magnitude of the reflection coefficient of the calibration sample, with due regard to the sign of the difference and the fact that dial 19 represents power attenuation. A specific example will illustrate the measurement procedure in more detail:

Assume the magnitude $|R|$ and the angle $R'$ of the voltage reflection coefficient of the calibration sample to be as follows:

$$|R|_c = 58\%$$
$$R_c' = 330°$$

The instrument is adjusted to a null with the calibration sample in place before the mouth of the horn. Dial 21 is set to 330° and the reading of dial 19 is noted and found to be, for example, 12 db. The calibration sample is then replaced by the unknown sample and the instrument readjusted to a null. Dial 21 may now read, for example, 340°, providing directly the angle of the unknown reflection coefficient.

$$R_u' = 340°$$

The new reading on dial 19 of the attenuator may, for example, be 13.5 db, indicating that the unknown sample produces 1.5 db more attenuation than the calibration sample. Since attenuator 18 is a power attenuator, in order to add the indicated increase in attenuation to the attenuation produced by the calibration sample to determine the attenuation of the unknown sample it is first necessary to convert the voltage reflection coefficient magnitude $|R|_c$ to the power reflection coefficient magnitude, which is $$|R|_c^2 = (.58)^2 = .3364 = 4.732 \text{ db}$$

Therefore, $$|R|_u^2 = 4.732 + 1.5 = 6.232 \text{ db} = 23.8\%$$

From which $$|R|_u = 48.8\%$$

Various properties of the dielectric test sample may be determined from the measured reflection coefficient. If the permeability of the sample is taken to be unity and the magnetic loss tangent zero, as is usually the case, and if the dielectric loss tangent is also assumed to be zero, the following relationships between the reflection coefficient and the electrical thickness and dielectric constant of the test sample hold:

(1) $$|R|^2 = \frac{4r^2 \sin^2 \phi}{(1-r^2) + 4r^2 \sin^2}$$

and (2) $$R' = 270° + \tan^{-1}\left(\frac{1+r^2}{1-r^2}\right) \tan \phi$$

where $|R|$ = absolute magnitude of voltage reflection $$\text{coefficient} = \frac{\text{voltage of incident wave}}{\text{voltage of reflected wave}}$$

$R'$ = reflection phase angle

= phase delay angle between incident wave and reflected wave $\phi$ = electrical thickness $$r = \frac{1-\sqrt{\epsilon}}{1+\sqrt{\epsilon}}$$

where $\epsilon$ = dielectric constant

Solving (1) and (2) simultaneously gives (3) $$\epsilon = \frac{\cos R' + |R|}{\cos R' - |R|}$$

(4) $$\phi = \cos^{-1}\left(\frac{\sin R'}{\sqrt{1-|R|^2}}\right)$$

Using the measured values of $|R|$ and $R'$ in Equations 3 and 4 the values of dielectric constant and electrical thickness for the test panel can be determined with sufficient accuracy for most practical purposes. Also, if values of dielectric constant and electrical thickness of the calibration sample are given rather than the values of $|R|$ and $R'$, the values of the latter for use in calibrating the instrument may be computed from Equations 1 and 2 with sufficient accuracy for most practical purposes.

Ideally the phase shifter 20 would produce no attenuation of the transmitted power and attenuator 18 would produce no phase shift of the transmitted power. While the attenuation error produced by the phase shifter is small enough to be neglected, the phase shift produced by a practical attenuator must be taken into account and a corresponding correction applied to the indication of phase shifter dial 21 for maximum accuracy in measuring the phase angle $R'$ of the reflection coefficient. Calibration curves for the attenuator are available for this purpose.

By a more involved process it is possible to accurately determine from measurements made by the instrument all four of the definitive dielectric properties of a dielectric sample. These properties are the dielectric constant, dielectric loss tangent, magnetic permeability and magnetic loss tangent. The procedure is first to measure, in the manner described above, the magnitude and angle of the reflection coefficient under the condition that the energy passing through the panel is completely absorbed or otherwise disposed of so that none of it returns to the sample. This may be accomplished, for example, by the use of a totally absorbing panel as in FIG. 1. The subscript $d$ is used to designate this condition, so that the measured values are $|R_d|^2$ and $R_d'$. Next, the magnitude and angle of the reflection coefficient are measured with the sample backed by a totally reflecting metal plate as in FIG. 3. The subscript $m$ is used to designate this condition and the measured values are $|R_m|^2$ and $R_m'$. The following equations relate these four measured values to the dielectric constant $\epsilon$, the permeability $\mu$, the dielectric loss tangent $\delta_\epsilon$ and the magnetic loss tangent $\delta_\mu$:

(6) $\quad |R_d|^2 = \dfrac{r^2[1 + e^{4\phi'} - 2e^{2\phi'} \cos 2\phi]}{e^{4\phi'} + r^4 - 2r^2 e^{2\phi'} \cos 2(\phi - r')}$ (7) $\quad R_d' = r' + \tan^{-1} \dfrac{-e^{2\phi'} \sin 2\phi}{1 - e^{2\phi'} \cos 2\phi}$ $\qquad - \tan^{-1} \dfrac{e^{2\phi'} \sin 2\phi - r^2 \sin 2r'}{e^{2\phi'} \cos 2\phi - r^2 \cos 2r'}$ (8) $\quad |R_m|^2 = \dfrac{|r|^2 e^{4\phi'} + 1 - 2|r| e^{2\phi'} \cos 2\phi}{e^{4\phi'} + |r|^2 - 2|r| e^{2\phi'} \cos (2\phi - r')}$ (9) $\quad R_m' = \tan^{-1} \dfrac{|r| e^{2\phi'} \sin 2\phi}{|r| e^{2\phi'} \cos 2\phi - 1}$ $\qquad - \tan^{-1} \dfrac{e^{2\phi'} \sin (2\phi - r')}{e^{2\phi'} \cos (2\phi - r') - |r|}$ in which

(10) $\quad |r|^2 = \dfrac{\mu \sec \delta_\mu + \epsilon \sec \delta_\epsilon - 2\sqrt{\epsilon \mu \sec \delta_\epsilon \delta_\mu} \cos \tfrac{1}{2}(\delta_\epsilon - \delta_\mu)}{\mu \sec \delta_\mu + \epsilon \sec \delta_\epsilon + 2\sqrt{\epsilon \mu \sec \delta_\epsilon \delta_\mu} \cos \tfrac{1}{2}(\delta_\epsilon - \delta_\mu)}$

(11) $\quad r' = \tan^{-1} \dfrac{2\sqrt{\epsilon \mu \sec \delta_\epsilon \sec \delta_\mu} \sin \tfrac{1}{2}(\delta_\epsilon - \delta_\mu)}{\mu \sec \delta_\mu - \epsilon \sec \delta_\epsilon}$

(12) $\quad \phi = \dfrac{2\pi d}{\lambda} \sqrt{\epsilon \mu \sec \delta_\epsilon \sec \delta_\mu} \sin \tfrac{1}{2}(\delta_\epsilon + \delta_\mu)$

(13) $\quad \phi' = \dfrac{2\pi d}{\lambda} \sqrt{\epsilon \mu \sec \delta_\epsilon \sec \delta_\mu} \sin \tfrac{1}{2}(\delta_\epsilon + \delta_\mu)$ where $d$ = physical thickness of sample
$\lambda$ = free space wavelength By solving Equations 6–9 simultaneously, the values of $\epsilon$, $\mu$, $\delta_\epsilon$ and $\delta_\mu$ may be determined.

Using the above method the magnitude $|T|^2$ and angle $T'$ of the complex transmission coefficient of the sample may be determined. The equations are:

(14) $\quad |T|^2 = ([|R_d|^2 + |R_m|^2 - 2|R_d| |R_m| \cos (R_d' - R_m')] [1 + |R_d|^2 + 2|R_d| \cos R_d'])^{1/2}$ and

(15) $\quad T' = \dfrac{1}{2} \tan^{-1} \dfrac{|R_d| \sin R_d' - |R_m| \sin R_m'}{|R_d| \cos R_d' - |R_m| \cos R_m'}$ $\qquad + \dfrac{1}{2} \tan^{-1} \dfrac{|R_d| \sin R_d'}{1 + |R_d| \cos R_d'}$ FIG. 4 shows the reflection coefficient measuring instrument of FIG. 1 with an automatic null seeking feature added. This form of the instrument is particularly desirable in checking a large dielectric panel for uniformity since the horn can be moved rapidly over the surface of the panel and variations in uniformity will be indicated in the movements of the attenuator and phase shifter dials as the circuit automatically maintains a constant null condition of the instrument. In this embodiment the instrument for convenience may be divided into two assemblies: a probe assembly 40 containing the horn and associated high frequency circuits, the null indicator and servomotors for actuating the attenuator and phase shifter; and a power supply-servo assembly 41 housing the high frequency source, the servomotor drive system and the required power sources. To allow portability of the probe assembly, the necessary connections between this assembly and the power supply-servo assembly are made with flexible cables of suitable length.

Referring in more detail to FIG. 4, in which the corresponding parts have the same reference numerals as in FIG. 1, the klystron oscillator 30 is the source of a high frequency $f_1$. This frequency is applied through directional coupler 42 and coaxial line 43 to the input of traveling wave tube amplifier 44. A portion of the $f_1$ energy from oscillator 30 is also coupled into coaxial line 45 by directional coupler 42 for reasons which will be explained later. The traveling wave tube amplifier 44, which may be a Hewlett-Packard Model 494A for example, produces an amplified offset frequency $f_1 + 10$ kc./s. in a manner well understood in the art and described in the literature on such amplifiers. Briefly, the traveling wave tube amplifier comprises an electron gun which projects a fine beam of electrons through a metal helix to a collector electrode. The input wave $f_1$ is applied to the helix and the velocity of the electrons in the beam is made to slightly exceed the velocity of propagation of the high frequency wave along the helix. By a process involving bunching of the electrons in the beam, energy is transferred from the beam to the wave as it travels along the helix, resulting in an amplified wave at the output end of the helix. It is a property of such tubes that the phase of the output wave is a function of the direct potential between the helix and the electron gun. Increasing this potential advances the phase of the output wave while decreasing it retards the output phase. By the process of applying a positive linear sawtooth of voltage between the helix and gun of such amplitude that the phase is advanced exactly one cycle for each sawtooth the output frequency can be increased by the frequency of the sawtooth wave. This method is employed in FIG. 4 to produce the frequency $f_1 + 10$ kc./s., the required 10 kc./s. sawtooth being produced by sawtooth generator 46 and applied to tube 44 over connection 47.

The $f_1 + 10$ kc./s. output of amplifier 44 is applied to arm "$a$" of directional coupler 14 and serves to energize the horn 15. The operation of the directional coupler, horn, attenuator 18, phase shifter 20 and magic T 24 are as described in connection with FIG. 1. The attenuator 18 and phase shifter 20 are driven by 2-phase servomotors 48 and 49, respectively, which are controlled in a manner to be described later.

The error signal for operating the null-seeking servo system is derived from the output of mixer 26. When the waves incident upon arms 1 and 2 of magic T 24 differ in amplitude or phase or both, an $f_1+10$ kc./s. output occurs in arm 4 and is applied to crystal mixer 26 along with the frequency $f_1$, the latter being applied to the mixer through directional coupler 49 from line 45. The 10 kc./s. difference frequency in the output of the mixer is selected and amplified by preamplifier 50. Null indicator 28 is actuated by a direct voltage proportional to the output of amplifier 50 and derived therefrom by means of amplifier 51 and rectifier 52. The output of preamplifier 50 is also applied over shielded conductor 53 and through amplifier 54 to the input of phase splitter 55. The phase splitter may be any suitable device for converting the 10 kc./s. sine wave input into two 10 kc./s. sine wave outputs having equal amplitudes and opposite phases, these two waves appearing on output conductors 56 and 57.

The reference signal with which the error signal is compared in the servo system is derived from the 10 kc./s. sawtooth wave produced by generator 46 and is the fundamental of this wave. The sine wave of fundamental frequency is selected from the sawtooth wave by means of a filter comprising resistor 58 and parallel resonant circuit 59 tuned to 10 kc./s. This 10 kc./s reference signal, after amplification in amplifier 60, appears on conductor 61.

In the null condition of the instrument, as already explained, the waves in arms 1 and 2 of the magic T 24 are of the same amplitude and phase and the signal in arm 4 is zero. Consequently the error signal in the output of mixer 26 is zero for this condition. The null condition will not exist and an error signal will appear whenever the waves in arms 1 and 2 differ in amplitude or phase, or both. Considering the two deviations separately, when the waves in arms 1 and 2 are of the same phase but different amplitudes the error signal has one of two phases 180° apart depending upon which of the waves has the greater amplitude, and when the waves in arms 1 and 2 are of the same amplitude but have different phases the error signal has one of two phases 180° apart depending upon which wave has the leading phase. The latter two phases differ from the first two phases as a function of the phase difference between the waves in arms 1 and 2. The phasing of the system, including the phase of the output of amplifier 44, is so adjusted that when the waves in arms 1 and 2 have the same phase but different amplitudes one of the signals on conductors 56 and 57 will have the same phase as the reference signal on conductor 61 and the other will have the opposite phase.

Phase sensitive rectifiers 62 and 63 are identical. Each has the phase opposed error signals on conductors 56 and 57 and the reference signal on conductor 61 applied thereto, the reference signal in the case of rectifier 63 being first shifted 90° in phase by network 64. The operation of the phase sensitive rectifiers when the error signal is zero is such that the direct voltages on the output conductors 65 and 66 or 67 and 68, are equal. In the presence of an error signal the output voltages of one or both rectifiers become unequal as will be explained later. Rectifier 62 is associated with and controls the energization of attenuation adjusting servomotor 47 while rectifier 63 similarly controls the energization of phase adjusting servomotor 48. Considering the operation of the attenuation channel of the servo system, the output potentials on conductors 65 and 66 control the operation of servo amplifier and motor control 69 which in turn controls the energization of the variable phase winding of servomotor 47, the fixed phase winding of this motor being constantly energized from alternating current source 70. The arrangement is such that if the voltages on conductors 65 and 66 are equal the variable phase winding is not energized and motor 47 does not rotate. If unequal, the variable phase winding is energized with a voltage leading or lagging the fixed phase energization by 90° and producing a rotation of the motor in one direction or the other depending upon which of the conductors 65 and 66 has the greater voltage. The operation of the phase channel containing servomotor 48 and servo amplifier and motor control 71 is similar.

The overall operation of the servo system can best be explained by considering (1) its operation when the error signal is due entirely to an error in amplitude and (2) when the error signal is due entirely to an error in phase. Condition (1) exists when the waves in arms 1 and 2 of the magic T have different amplitudes but the same phase. In this case, as already pointed out, the error signal in the output of mixer 26 has one of two phases 180° apart, depending upon which of the two waves has the greater magnitude, and one or the other of the oppositely phased signals on conductors 56 and 57 is in phase with the reference signal on conductor 61. Under these conditions one of the potentials on conductors 65 and 66 exceeds the other and motor 47 is caused to rotate. The direction of rotation, and resulting adjustment of the attenuator 18, is made such as to reduce the difference in the magnitudes of the waves in arms 1 and 2 of the magic T and thus reduce the error signal due to this cause to zero. The voltages on output conductors 67 and 68 of phase sensitive rectifier 63 remain equal under condition (1) since the reference signal on conductor 72 in this case is midway in phase between the signals on conductors 56 and 57 and therefore the vector sums of these signals and the reference signal are of equal magnitudes. Consequently servomotor 48 is not energized under condition (1).

Condition (2) exists when the waves in arms 1 and 2 of the magic T have equal amplitudes but differ in phase. Under this condition the phase angle between one of the signals on conductors 56 and 57 and the reference signal on conductor 72 is greater than 90° and the phase angle between the other of these signals and the reference signal is less than 90°. The two vector sums are therefore unequal in this case with the result that the voltages on conductors 67 and 68 are unequal and motor 48 is energized. The direction of rotation of the motor and phase shifter 20 is such as to reduce the phase difference between the waves on arms 1 and 2 of the magic T and thus reduce the error signal due to this cause to zero. The outputs of phase sensitive rectifier 62 during condition (2) are also unbalanced causing energization of servomotor 47. However, this does not interfere with the action of the phase servo channel in producing equality between the phases of the waves in arms 1 and 2 of the magic T, and, when this equality is established, the two waves are quickly brought to amplitude equality by the attenuation servo channel.

The two channels of the servo system, therefore, operate continuously to maintain amplitude and phase equality between the waves in arms 1 and 2 of the magic T, so that the null state of the instrument is automatically maintained at all times.

We claim:

1. Apparatus for measuring the complex reflection coefficient of a body comprising a source of high frequency power, a radiator for directing high frequency power against the surface of said body and for receiving reflections thereof from said body, means for coupling said source to said radiator for energizing said radiator, said coupling means also diverting a fixed portion of the radiator energizing power into a first branch circuit and a fixed portion of the power reflected from said sample into a second branch circuit, an adjustable calibrated power attenuator in said first branch circuit, an adjustable calibrated phase shifter in said second branch circuit, means coupled to said attenuator and phase shifter for deriving the vector difference of the powers leaving said phase shifter and attenuator, and means coupled to said last named means for indicating the magnitude of said vector difference.

2. Apparatus for measuring the complex reflection coefficient of a dielectric sample comprising a source of high frequency power, a radiating horn for directing high frequency power against the surface of said dielectric sample and for receiving reflections thereof from said sample, a directional coupler having arms "a," "b," "c" and "d," said coupler having a large coupling ratio from arm "a" to arm "b," a relatively small coupling ratio from arm "a" to arm "d," a large coupling ratio from arm "b" to arm "c," and insignificant transfer of power from arm "a" to arm "c" and from arm "b" to arm "d," means coupling said source to arm "a," means coupling said horn to arm "b," an adjustable calibrated attenuator coupled to arm "d," an adjustable calibrated phase shifter coupled to arm "c," means coupled to said attenuator and phase shifter for deriving the vector difference of the powers leaving said phase shifter and attenuator, and means coupled to said last named means for indicating the magnitude of said vector difference.

3. Apparatus as claimed in claim 2 in which said vector difference deriving means is a magic T network having one side arm connected to said phase shifter, the other side arm connected to said attenuator and its H-arm connected to said indicating means.

References Cited in the file of this patent

UNITED STATES PATENTS

| | | |
|---|---|---|
| 2,522,367 | Guanella | Sept. 12, 1950 |
| 2,605,323 | Samuel | July 29, 1952 |
| 2,756,387 | Barnett | July 24, 1956 |
| 2,798,197 | Thurston | July 2, 1957 |

OTHER REFERENCES

Gabriel: "An Automatic Impedance Recorder For X-Band" NLR Report 4204, August 20, 1953; pages 1–20.

Hewlett-Packard Publication: "The HP Microwave Reflecto-meters," Hewlett-Packard Journal, Vol. 6, Nos. 1–2, September-October, 1954; pages 1–7.